(12) United States Patent
Cheng (10) Patent No.: US 9,690,695 B2
(45) Date of Patent: Jun. 27, 2017

(54) DATA STORAGE DEVICE AND FLASH MEMORY CONTROL METHOD THEREOF

(71) Applicant: Silicon Motion, Inc., Jhubei, Hsinchu County (TW)

(72) Inventor: Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 321 days.

(21) Appl. No.: 14/013,274

(22) Filed: Aug. 29, 2013

(65) Prior Publication Data

US 2014/0082265 A1    Mar. 20, 2014

Related U.S. Application Data (60) Provisional application No. 61/703,443, filed on Sep. 20, 2012.

(51) Int. Cl.
*G06F 12/02* (2006.01)
(52) U.S. Cl.
CPC ................ *G06F 12/0246* (2013.01)
(58) Field of Classification Search
CPC .. G06F 3/0647; G06F 3/0665; G06F 12/0246; G06F 3/067; G06F 2212/2022; G06F 3/0631; G06F 2212/7201; G06F 3/0688; G06F 9/5077; G06F 2009/45583; G06F 17/30575; G06F 2201/815; G06F 3/064; G06F 3/0689; G06F 12/023; G06F 12/10
See application file for complete search history.

(56) References Cited

U.S. PATENT DOCUMENTS

| | | | | |
|---|---|---|---|---|
| 5,129,088 A | * | 7/1992 | Auslander | G06F 3/0601 707/E17.034 |
| 7,467,253 B2 | | 12/2008 | Yero | |
| 7,653,777 B2 | | 1/2010 | Tan et al. | |

(Continued)

FOREIGN PATENT DOCUMENTS

| | | |
|---|---|---|
| CN | 1700189 | 11/2005 |
| CN | 1926616 | 3/2007 |

(Continued)

OTHER PUBLICATIONS

English language machine translation of TW 200809864 (published Feb. 16, 2008).

(Continued)

*Primary Examiner* — David X Yi
*Assistant Examiner* — Candice Rankin
(74) *Attorney, Agent, or Firm* — McClure, Qualey & Rodack, LLP (57) ABSTRACT

A mapping table H2F update technique for a FLASH memory is disclosed. In a disclosed data storage device, the controller updates a logical-to-physical address mapping table between a host and the FLASH memory in accordance with a group count of a buffer block of the FLASH memory. The group count reflects a logical address distribution of write data buffered in the buffer block and with non-updated logical-to-physical address mapping information. The higher the group count, the more dispersed the logical address distribution. In this manner, each update of the logical-to-physical address mapping table just takes a short time.

6 Claims, 8 Drawing Sheets

(56) References Cited

U.S. PATENT DOCUMENTS

| | | |
|---|---|---|
| 8,230,161 B2 | 7/2012 | Chu |
| 8,688,894 B2 | 4/2014 | Kuehne |
| 8,832,357 B2 | 9/2014 | Yao et al. |
| 2008/0294814 A1 | 11/2008 | Gorobets |
| 2009/0132496 A1* | 5/2009 | Chen .................. G06F 17/30011 |
| 2010/0030946 A1* | 2/2010 | Kano .................... G06F 3/0608 711/103 |
| 2011/0004720 A1 | 1/2011 | Chiang et al. |
| 2011/0010489 A1* | 1/2011 | Yeh ..................... G06F 12/0246 711/103 |
| 2012/0239862 A1* | 9/2012 | Seo ..................... G06F 12/0246 711/103 |
| 2014/0013033 A1 | 1/2014 | Sharon et al. |

FOREIGN PATENT DOCUMENTS

| | | |
|---|---|---|
| EP | 1 736 884 | 12/2006 |
| TW | 200809864 | 2/2008 |
| TW | 200915072 | 4/2009 |
| TW | 201102813 | 1/2011 |
| TW | 201117001 | 5/2011 |
| TW | 201122812 | 7/2011 |
| TW | 201201214 | 1/2012 |
| TW | 201214116 | 4/2012 |
| TW | 201216288 | 4/2012 |

OTHER PUBLICATIONS

English language machine translation of TW 200915072 (published Apr. 1, 2009).

English language machine translation of TW TW 201102813 (published Jan. 16, 2011).

English language machine translation of TW 201117001 (published May 16, 2011).

English language machine translation of TW 201122812 (published Jul. 1, 2011).

English language machine translation of TW 201201214 (published Jan. 1, 2012).

English language machine translation of TW 201214116 (published Apr. 1, 2012).

English language machine translation of TW 201216288 (published Apr. 16, 2012).

* cited by examiner

DATA STORAGE DEVICE AND FLASH MEMORY CONTROL METHOD THEREOF

CROSS REFERENCE TO RELATED APPLICATIONS

This application claims the benefit of U.S. Provisional Application No. 61/703,443 filed Sep. 20, 2012, the entirety of which is incorporated by reference herein.

BACKGROUND OF THE INVENTION

Field of the Invention

The present invention relates to data storage devices, and in particular to FLASH memory control methods.

Description of the Related Art

A Flash memory is a general non-volatile storage device that is electrically erased and programmed A NAND Flash, for example, is primarily used in memory cards, USB flash devices, solid-state drives, eMMCs (embedded MultiMediaCards), and so on.

A FLASH memory may be coupled to a host as a data storage medium. Therefore, a logical-to-physical address mapping table between the host and the FLASH memory is required. The maintenance of the logical-to-physical address mapping table is an important issue.

BRIEF SUMMARY OF THE INVENTION

A data storage device and a FLASH memory control method thereof are disclosed.

A data storage device in accordance with an exemplary embodiment of the disclosure comprises a FLASH memory and a controller. The FLASH memory provides storage space which is divided into a plurality of blocks. Each block comprises a plurality of pages. The controller operates the FLASH memory in accordance with commands issued from a host. Note that the controller updates a logical-to-physical address mapping table between the host and the FLASH memory in accordance with a group count of a buffer block selected from the plurality of blocks of the FLASH memory. The group count reflects a logical address distribution of write data buffered in the buffer block and with non-updated logical-to-physical address mapping information. The higher the group count, the more dispersed the logical address distribution.

In another exemplary embodiment of the disclosure, a FLASH memory control method is shown, which comprises the following steps: using a FLASH memory to provide storage space which is divided into a plurality of blocks, wherein each block comprises a plurality of pages; operating the FLASH memory in accordance with commands issued from a host; and updating a logical-to-physical address mapping table between the host and the FLASH memory in accordance with a group count of a buffer block selected from the plurality of blocks of the FLASH memory. The group count reflects a logical address distribution of write data buffered in the buffer block and with non-updated logical-to-physical address mapping information. The higher the group count, the more dispersed the logical address distribution.

In an exemplary embodiment of the disclosure, each page of a logical-to-physical address mapping table is divided into X entries for storage of physical address information of X logical addresses. X is a number. X logical addresses, sharing one page for recording the logical-to-physical address mapping information thereof, are classified as belonging to one group. The group count is evaluated based on the group classification of the logical addresses of write data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 shows a logical-to-physical address mapping table H2F recorded in a FLASH memory in accordance with an exemplary embodiment of the disclosure, wherein the logical-to-physical address mapping table H2F is stored in a plurality of pages H2F_for_Group1, H2F_for_Group2 and so on;

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

For a FLASH memory operated according to commands issued from a host, a logical-to-physical address mapping table between the host and FLASH memory is required. The logical-to-physical address mapping table should be updated onto the FLASH memory for non-volatile storage.

Figure 1:
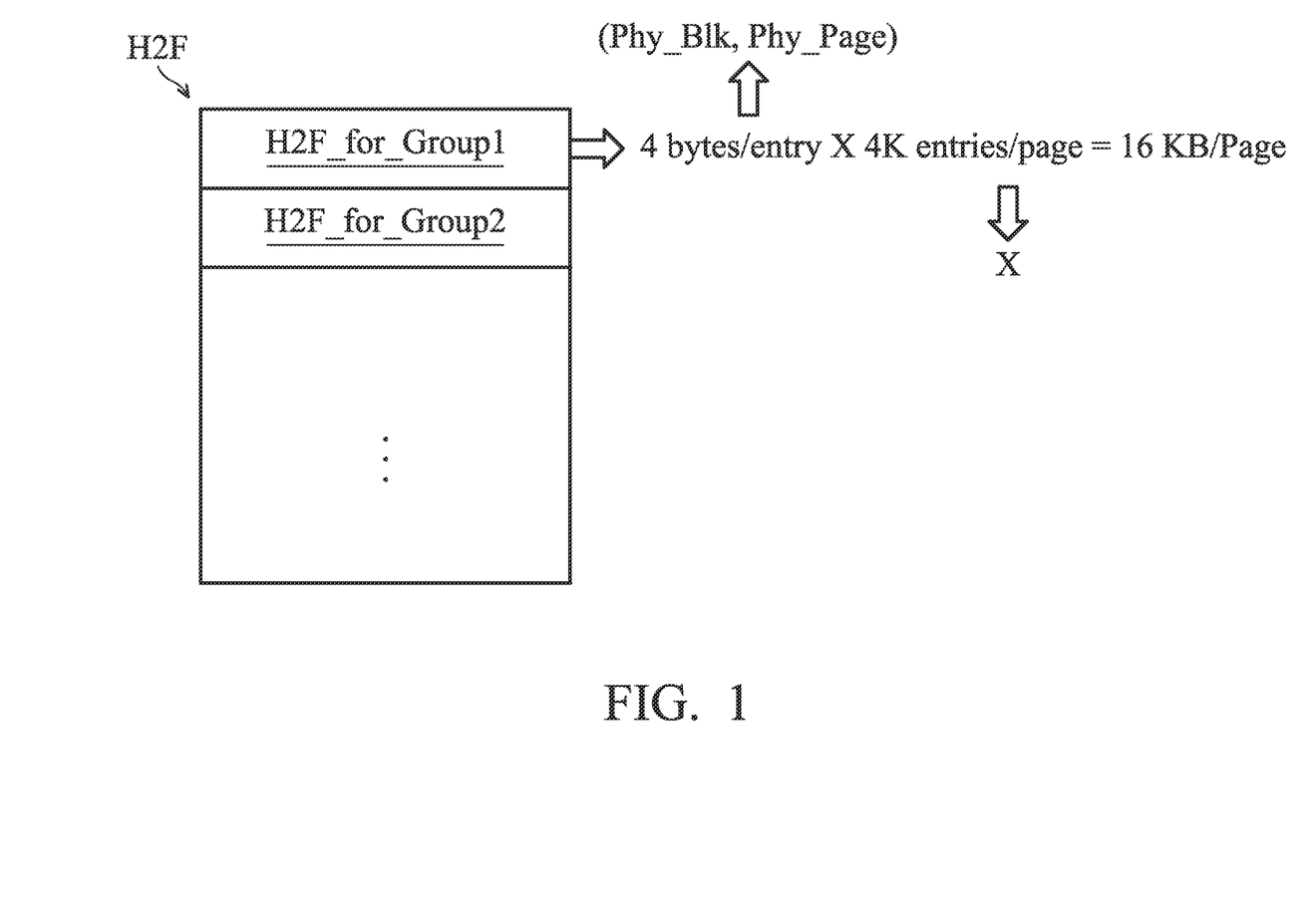

FIG. 1 shows a logical-to-physical address mapping table H2F recorded in a FLASH memory in accordance with an exemplary embodiment of the disclosure. The logical-to-physical address mapping table H2F is stored in a plurality of pages H2F_for_Group1, H2F_for_Group2 and so on. Each page of the logical-to-physical address mapping table H2F is divided into X entries for storage of the physical address information of X logical addresses. X is a number. Referring to the exemplary embodiment of FIG. 1, the logical-to-physical address mapping information about each logical address takes 4 bytes long, including a physical block number Phy_Blk and a physical page number Phy_Page. In this exemplary embodiment, the number X is 4K because the page size is 16 KB, 16 KB/4 B=4K. The different 4K logical addresses, sharing one page for recording the logical-tophysical address mapping information thereof, are classified as belonging to one group and may be consecutive logical addresses. Page H2F_for_Group1 is stored with physical address information of 4K different logical addresses, wherein the 4K different logical addresses are classified as belonging to one group. Page H2F_for_Group2 is stored with physical address information of 4K different logical addresses, wherein the 4K different logical addresses are classified as belonging to another group. In the disclosure, to shorten the time spent on each update of the logical-to-physical address mapping table H2F, the page amount for each update of the logical-to-physical address mapping table H2F is controlled to be less than a threshold amount. In other words, the update of the logical-to-physical address mapping table H2F is controlled based on the group classification for logical addresses of write data.

Figure 2:
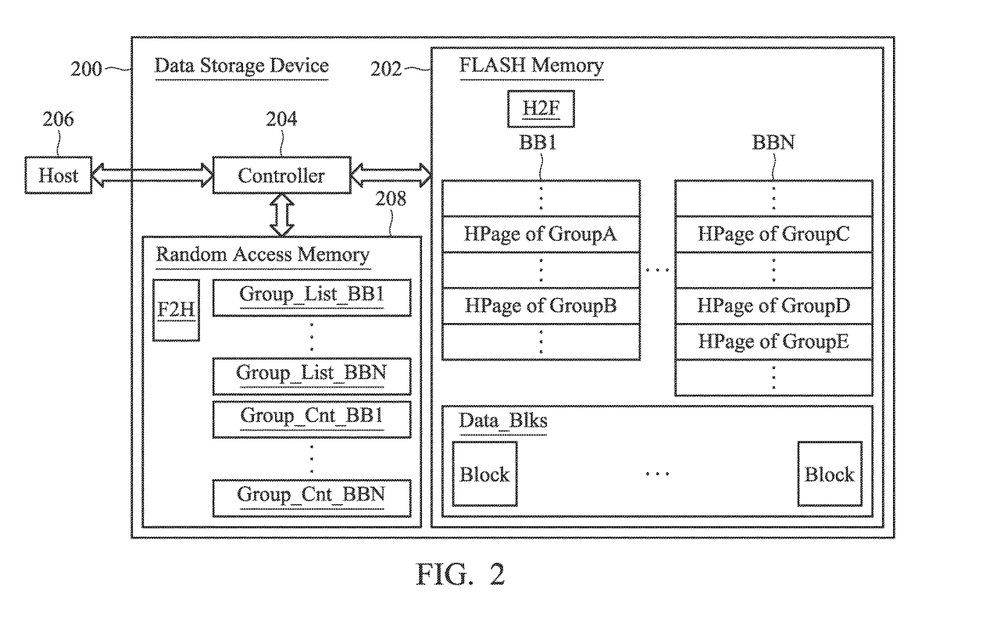
FIG. 2 is a block diagram depicting a data storage device 200 in accordance with an exemplary embodiment of the disclosure.

FIG. 2 is a block diagram depicting a data storage device 200 in accordance with an exemplary embodiment of the disclosure. The data storage device 200 comprises a FLASH memory 202 and a controller 204. The controller 204 operates the FLASH memory 202 in accordance with commands issued from a host 206. The FLASH memory 202 provides storage space which is divided into a plurality of blocks. Each block comprises a plurality of pages. An erase operation has to be performed on an entire block. The entire space of a block has to be released together.

As shown, some of the blocks are allocated as buffer blocks BB1 to BBN. Via the controller 204, write data issued from the host 206 is buffered by the buffer blocks BB1 to BBN. When a buffer block is pushed to the data blocks Data_Blks, a substitute buffer block is allocated for subsequent write-data buffering. To access the data stored in the FLASH memory 202 (in the data blocks Data_Blks or in the buffer blocks BB1 to BBN), a logical-to-physical address mapping table H2F between the host 206 and the FLASH memory 202 is required. As shown, the mapping table H2F is uploaded onto the FLASH memory 202 for non-volatile storage.

Referring to FIG. 2, the data storage device 200 further comprises a random access memory 208 in which a physical-to-logical address mapping table F2H between the FLASH memory 202 and the host 206 as well as the group lists Group_List_BB1 to Group_List_BBN and the group counts Group_Cnt_BB1 to Group_Cnt_BBN for the different buffer blocks BB1 to BBN are updated in real-time. The logical-to-physical address mapping table H2F is updated based on the real-time mapping information maintained on the random access memory 208 in the physical-to-logical address mapping table F2H. The group lists Group_List_BB1 to Group_List_BBN and the group counts Group_Cnt_BB1 to Group_Cnt_BBN are maintained based on the group classification introduced in FIG. 1. As for the buffer block BB1, the pages (HPages) buffered therein and with non-updated logical-to-physical address mapping information involve logical addresses belonging to GroupA and GroupB. Thus, the controller 204 lists the two groups GroupA and GroupB in the group list Group_List_BB1 and sets the group count Group_Cnt_BB1 to 2. As for the buffer block BBN, the pages (HPages) buffered therein and with non-updated logical-to-physical address mapping information involve logical addresses belonging to GroupC, GroupD and GroupE. Thus, the controller 204 lists the three groups GroupC, GroupD and GroupE in the group list Group_List_BBN and sets the group count Group_Cnt_BBN to 3. Based on the group lists Group_List_BB1 to Group_List_BBN and the group counts Group_Cnt_BB1 to Group_Cnt_BBN, the controller 204 decides the timing of the update of the logical-to-physical address mapping table H2F. In this manner, an appropriate period of time is consumed in each update of the logical-to-physical address mapping table H2F. For example, the controller 204 may update the logical-to-physical address mapping table H2F when any of the group counts Group_Cnt_BB1 to Group_Cnt_BBN exceeds a threshold value. Further, when any of the buffer blocks BB1 to BBN is full, the controller 204 may update the logical-to-physical address mapping table H2F as well.

Figure 3A:
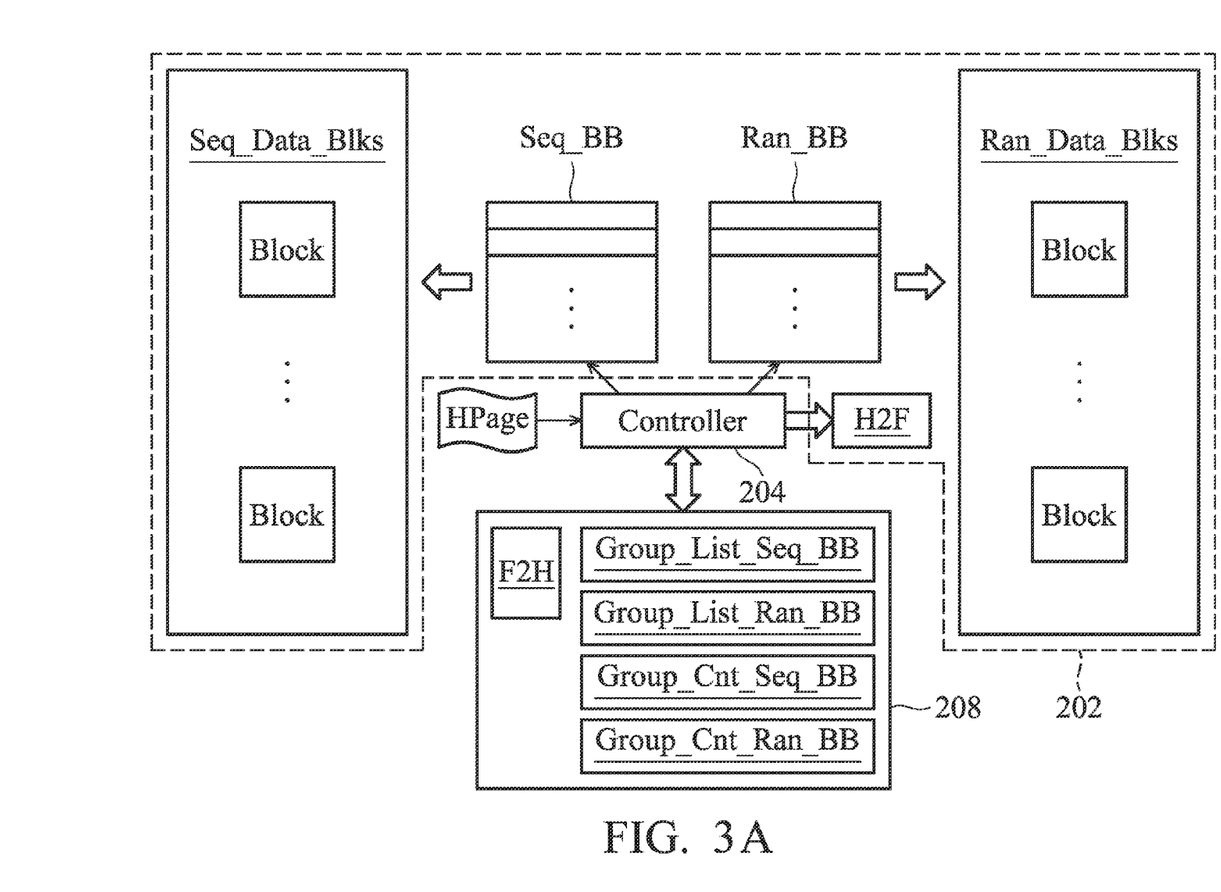
FIG. 3A shows an exemplary embodiment of the disclosure, in which the sequential data (e.g., with continuous logical addresses) and the random data (e.g., with random logical addresses) are buffered separately.

FIG. 3A shows an exemplary embodiment of the disclosure, in which the sequential data (e.g., with continuous logical addresses) and the random data (e.g., with random logical addresses) are buffered separately. The buffer block for sequential data is named Seq_BB. The buffer block for random data is named Ran_BB. Once filled, the buffer block Seq_BB is pushed to the sequential data blocks Seq_Data_Blks and then a substitute buffer block is allocated to buffer the subsequent sequential data. Once filled, the buffer block Ran_BB is pushed to the random data blocks Ran_Data_Blks and then a substitute buffer block is allocated to buffer the subsequent random data. The controller 204 maintains a group list Group_List_Seq_BB and a group count Group_Cnt_Seq_BB for the buffer block Seq_BB, and maintains a group list Group_List_Ran_BB and a group count Group_Cnt_Ran_BB for the buffer block Ran_BB. When write data (e.g., an HPage) is sent to the controller 204, the controller 204 buffers the write data into the buffer block Seq_BB or Ran_BB and modifies the information F2H, Group_List_Seq_BB, Group_List_Ran_BB, Group_Cnt_Seq_BB or Group_Cnt_Ran_BB accordingly. The logical-to-physical address mapping table H2F (stored in the FLASH memory 202) is updated based on the real-time mapping information maintained in the physical-to-logical address mapping table F2H. Based on the group lists Group_List_Seq_BB and Group_List_Ran_BB and the group counts Group_Cnt_Seq_BB and Group_Cnt_Ran_BB, the controller 204 decides the timing of the update of the logical-to-physical address mapping table H2F.

Figure 3B:
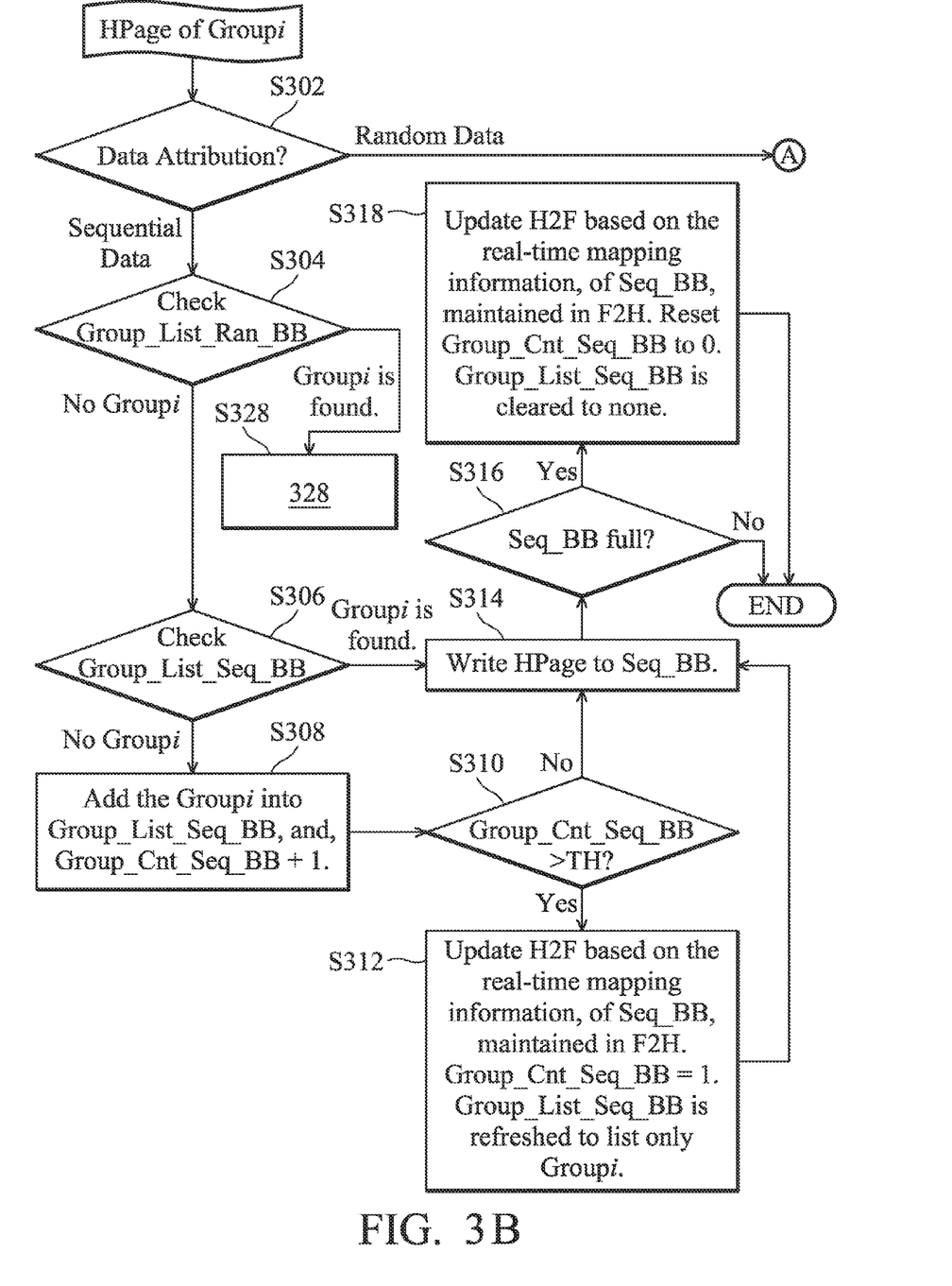
FIG. 3B and FIG. 3C show a flowchart depicting how the logical-to-physical address mapping table H2F is updated in accordance with an exemplary embodiment of the disclosure, wherein the sequential data and the random data are buffered separately as shown in FIG. 3A.
Figure 3C:
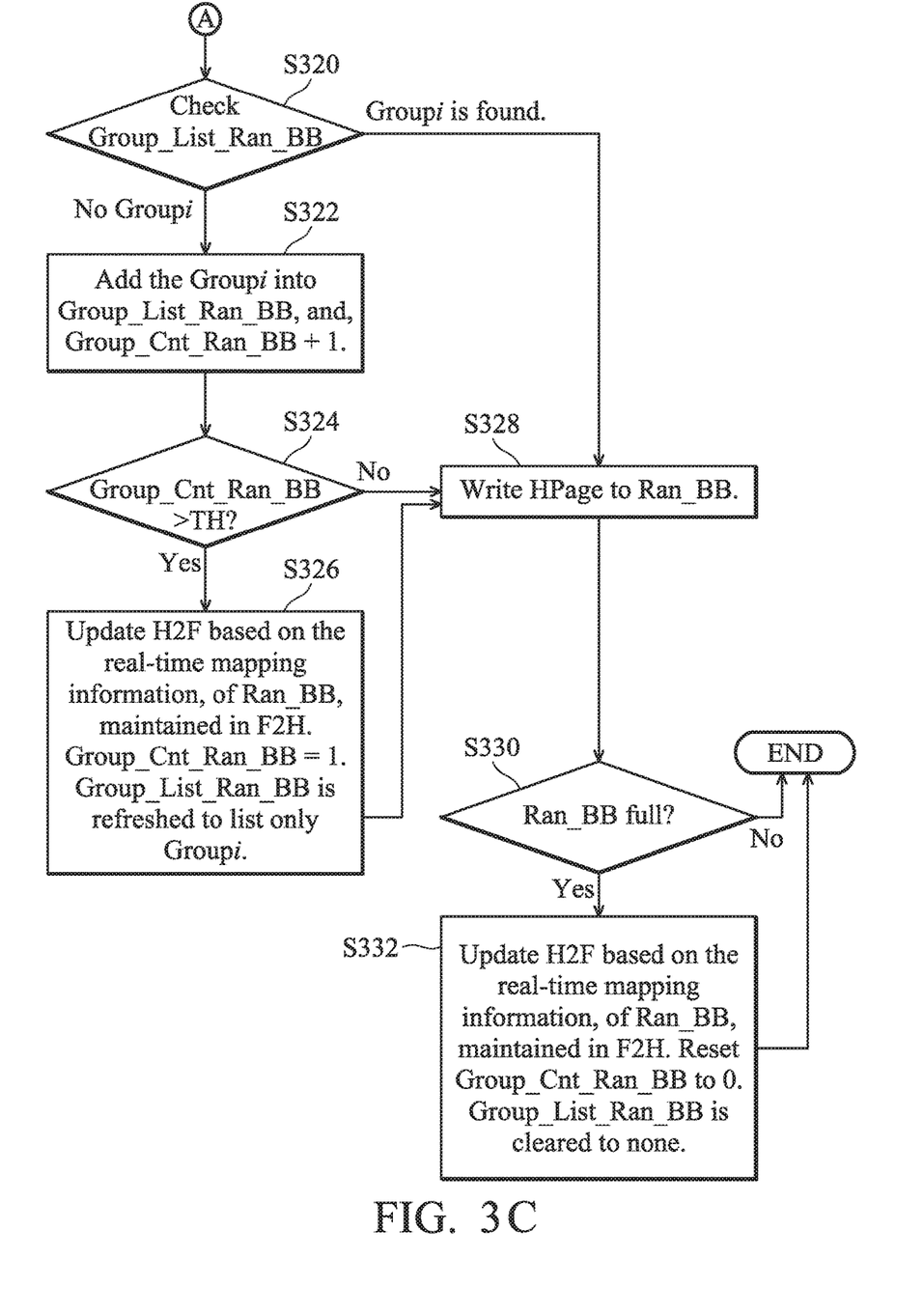

FIG. 3B and FIG. 3C show a flowchart depicting how the logical-to-physical address mapping table H2F is updated in accordance with an exemplary embodiment of the disclosure, wherein the sequential data and the random data are buffered separately as shown in FIG. 3A.

When write data (an Hpage having a logical address corresponding to Groupi) is received, step S302 is performed to determine the data attribution. When the write data is sequential data (e.g., having a logical address sequential to the previous write data), step S304 is performed to examine whether the group Groupi has been listed in the group list Group_List_Ran_BB. When the group Groupi is not found in the group list Group_List_Ran_BB, step S306 is performed to check the group list Group_List_Seq_BB. When the group Groupi is not found in the group list Group_List_Seq_BB, step S308 is performed to add the group Groupi into the group list Group_List_Seq_BB and add one to the group count Group_Cnt_Seq_BB. Then, step S310 is performed to check whether the group count Group_Cnt_Seq_BB exceeds a threshold value TH. When the group count Group_Cnt_Seq_BB exceeds the threshold value TH, step S312 is performed to update the logical-to-physical address mapping table H2F based on the real-time mapping information about the buffer block Seq_BB maintained in the mapping table F2H. In step S312, the group count Group_Cnt_Seq_BB is refreshed to 1 and the group list Group_List_Seq_BB is refreshed to list only the group Groupi. After step S312, step S314 is performed to push the write data Hpage into the FLASH memory 202 to be buffered by the buffer block Seq_BB. Step S316 is performed to check whether the buffer block Seq_BB is full. When the buffer block Seq_BB still has space to spare, the process ends. When the buffer block Seq_BB is full, step S318 is performed to update the logical-to-physical address mapping table H2F based on the real-time mapping information about the buffer block Seq_BB maintained in the mapping table F2H. In step S318, the buffer block Seq_BB filled with data is pushed to the data blocks Seq_Data_Blks and a substitute buffer block is allocated for the subsequent sequential data buffering. Further, in step S318, the group count Group_Cnt_Seq_BB is reset to 0 and the group list Group_List_Seq_BB is cleared to none for the newly allocated buffer block Seq_BB. Then, the process ends.

When it is determined in step S306 that the group list Group_List_Seq_BB already contains the group Groupi, the write data Hpage is pushed into the FLASH memory 202 to be buffered by the buffer block Seq_BB by step S314 without changing the status of the group list Group_List_Seq_BB and the group count Group_Cnt_Seq_BB. When it is determined in step S310 that the group count Group_Cnt_Seq_BB does not exceed the threshold value TH, the write data Hpage is pushed into the FLASH memory 202 to be buffered by the buffer block Seq_BB by step S314 without the logical-to-physical address mapping table H2F update of step S312.

When it is determined in step S302 that the write data Hpage is random data, e.g., having a logical address discontinuous to the previous write data, step S320 of FIG. 3C is performed to check the group list Group_List_Ran_BB. When the group Groupi is not found in the group list Group_List_Ran_BB, step S322 is performed to add the group Groupi into the group list Group_List_Ran_BB and add one to the group count Group_Cnt_Ran_BB. Then, step S324 is performed to check whether the group count Group_Cnt_Ran_BB exceeds a threshold value TH. When the group count Group_Cnt_Ran_BB exceeds the threshold value TH, step S326 is performed to update the logical-to-physical address mapping table H2F based on the real-time mapping information about the buffer block Ran_BB maintained in the mapping table F2H. In step S326, the group count Group_Cnt_Ran_BB is refreshed to 1 and the group list Group_List_Ran_BB is refreshed to list only the group Groupi. After step S326, step S328 is performed to push the write data Hpage into the FLASH memory 202 to be buffered by the buffer block Ran_BB. Step S330 is performed to check whether the buffer block Ran_BB is full. When the buffer block Ran_BB still has space to spare, the process ends. When the buffer block Ran_BB is full, step S332 is performed to update the logical-to-physical address mapping table H2F based on the real-time mapping information about the buffer block Ran_BB maintained in the mapping table F2H. In step S332, the buffer block Ran_BB filled with data is pushed to the data blocks Ran_Data_Blks and a substitute buffer block is allocated for the subsequent random data buffering. Further, in step S332, the group count Group_Cnt_Ran_BB is reset to 0 and the group list Group_List_Ran_BB is cleared to none for the newly allocated buffer block Ran_BB. Then, the process ends.

When it is determined in step S320 that the group list Group_List_Ran_BB already contains the group Groupi, the write data Hpage is pushed into the FLASH memory 202 to be buffered by the buffer block Ran_BB by step S328 without changing the status of the group list Group_List_Ran_BB and the group count Group_Cnt_Ran_BB. When it is determined in step S324 that the group count Group_Cnt_Ran_BB does not exceed the threshold value TH, the write data Hpage is pushed into the FLASH memory 202 to be buffered by the buffer block Ran_BB by step S328 without the logical-to-physical address mapping table H2F update of step S326.

Referring back to FIG. 3B, when it is determined in step S304 that the group list Group_List_Ran_BB already contains the group Groupi, the write data Hpage is pushed into the FLASH memory 202 to be buffered by the buffer block Ran_BB (by step S328 of FIG. 3C) rather than being buffered by the buffer block Seq_BB. Step S304, that of checking the group list Group_List_Ran_BB, is optional, depending on the user's requirements.

Figure 4:
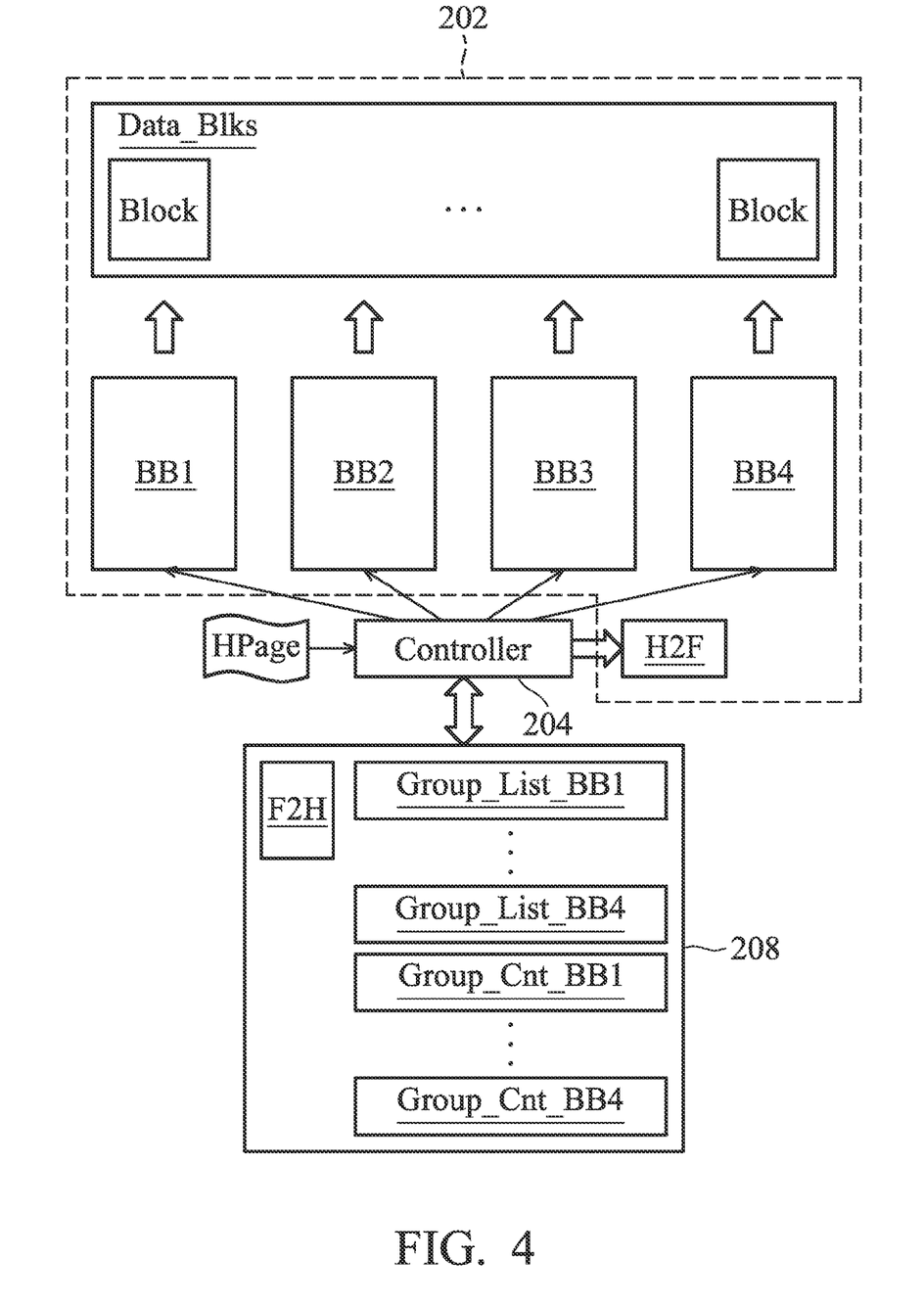
FIG. 4 shows an exemplary embodiment of the disclosure, in which four buffer blocks BB1 to BB4 are utilized to buffer write data.

FIG. 4 shows an exemplary embodiment of the disclosure, in which four buffer blocks BB1 to BB4 are utilized to buffer write data. When a buffer block with write data is pushed to the data blocks Data_Blks, a substitute buffer block is allocated to buffer the subsequent write data. In the random access memory 208, the controller 204 maintains the group lists Group_List_BB1 to Group_List_BB4 and group counts Group_Cnt_BB1 to Group_Cnt_BB4 for the four different buffer blocks BB_1 to BB_4 in real time. The way that the controller 204 writes data (e.g., an HPage) into the FLASH memory 202 and updates the real-time mapping information from the mapping table F2H to the mapping table H2F depends on the group lists Group_List_BB1 to Group_List_BB4 and the group counts Group_Cnt_BB1 to Group_Cnt_BB4.

Figure 5A:
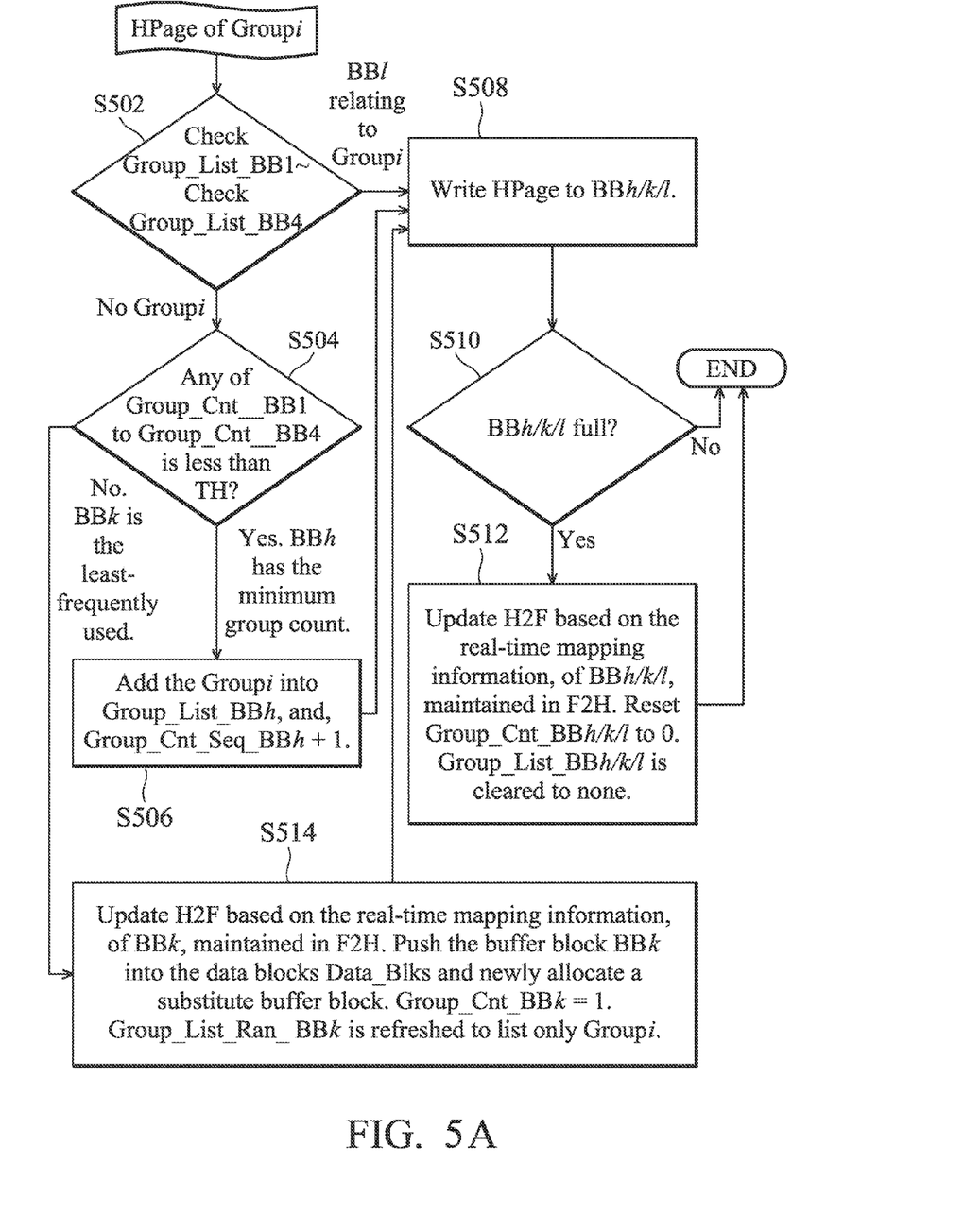
FIG. 5A and FIG. 5B show two different exemplary embodiments of the disclosure, depicting how the logical-to-physical address mapping table H2F is updated, wherein four buffer blocks are provided as shown in FIG. 4.

FIG. 5A shows a flowchart depicting how the logical-to-physical address mapping table H2F is updated in accordance with an exemplary embodiment of the disclosure, wherein four buffer blocks are provided as shown in FIG. 4. When write data (an Hpage having a logical address corresponding to Groupi) is received, step S502 is performed to examine whether the group Groupi has been listed in the group lists Group_List_BB1 to Group_List_BB4. When the group Groupi is not found in the group lists Group_List_BB1 to Group_List_BB4, step S504 is performed to check whether any of the group counts Group_Cnt_BB1 to Group_Cnt_BB4 is less than a threshold value. When it is determined in step S504 that there is at least one group count lower than the threshold value and the minimum group count corresponds to the group Grouph, step S506 is performed to add the group Groupi into the group list Group_List_BBh and add one to the group count Group_Cnt_BBh. After step S506, step S508 is performed to push the write data Hpage into the FLASH memory 202 to be buffered by the buffer block BBh. Step S510 is performed to check whether the buffer block BBh is full. When the buffer block BBh is full, step S512 is performed to update the logical-to-physical address mapping table H2F based on the real-time mapping information about the buffer block BBh maintained in the mapping table F2H. In step S512, the buffer block BBh filled with data is pushed to the data blocks Data_Blks and a substitute buffer block is allocated. Further, in step S512, the group count Group_Cnt_BBh is reset to 0 and the group list Group_List_BBh is cleared to none for the newly allocated buffer block BBh. Then, the process ends.

When it is determined in step S504 that every group count is higher than the threshold value and the least-frequently used buffer block among the four buffer blocks BB1 to BB4 is BBk, step S514 is performed to update the logical-to-physical address mapping table H2F based on the real-time mapping information about the buffer block BBk maintained in the mapping table F2H. In step S514, the buffer block BBk is pushed to the data blocks Data_Blks and a substitute buffer block is allocated. For the newly allocated buffer block BBk, the group count Group_Cnt_BBk is refreshed to 1 and the group list Group_List_Seq_BB is refreshed to list only the group Groupi in step S514. After step S514, step S508 is performed to push the write data Hpage into the FLASH memory 202 to be buffered by the buffer block BBk. Step S510 is performed to check whether the buffer block BBk is full. When the buffer block BBk is full, step S512 is performed to update the logical-to-physical address mapping table H2F based on the real-time mapping information about the buffer block BBk maintained in the mapping table F2H. In step S512, the buffer block BBk filled with data is pushed to the data blocks Data_Blks and a substitute buffer block is allocated. Further, in step S512, the group count Group_Cnt_BBk is reset to 0 and the group list Group_List_BBk is cleared to none for the newly allocated buffer block BBk. Then, the process ends.

When it is determined in step S502 that the group Groupi has been listed in the group list Group_List_BBl, step S508 is performed to push the write data Hpage into the FLASH memory 202 to be buffered by the buffer block BBl. Step S510 is performed to check whether the buffer block BBl is full. When the buffer block BBl is full, step S512 is performed to update the logical-to-physical address mapping table H2F based on the real-time mapping information about the buffer block BBl maintained in the mapping table F2H. In step S512, the buffer block BBl filled with data is pushed to the data blocks Data_Blks and a substitute buffer block is allocated. Further, in step S512, the group count Group_Cnt_BBl is reset to 0 and the group list Group_List_BBl is cleared to none for the newly allocated buffer block BBl. Then, the process ends.

Figure 5B:
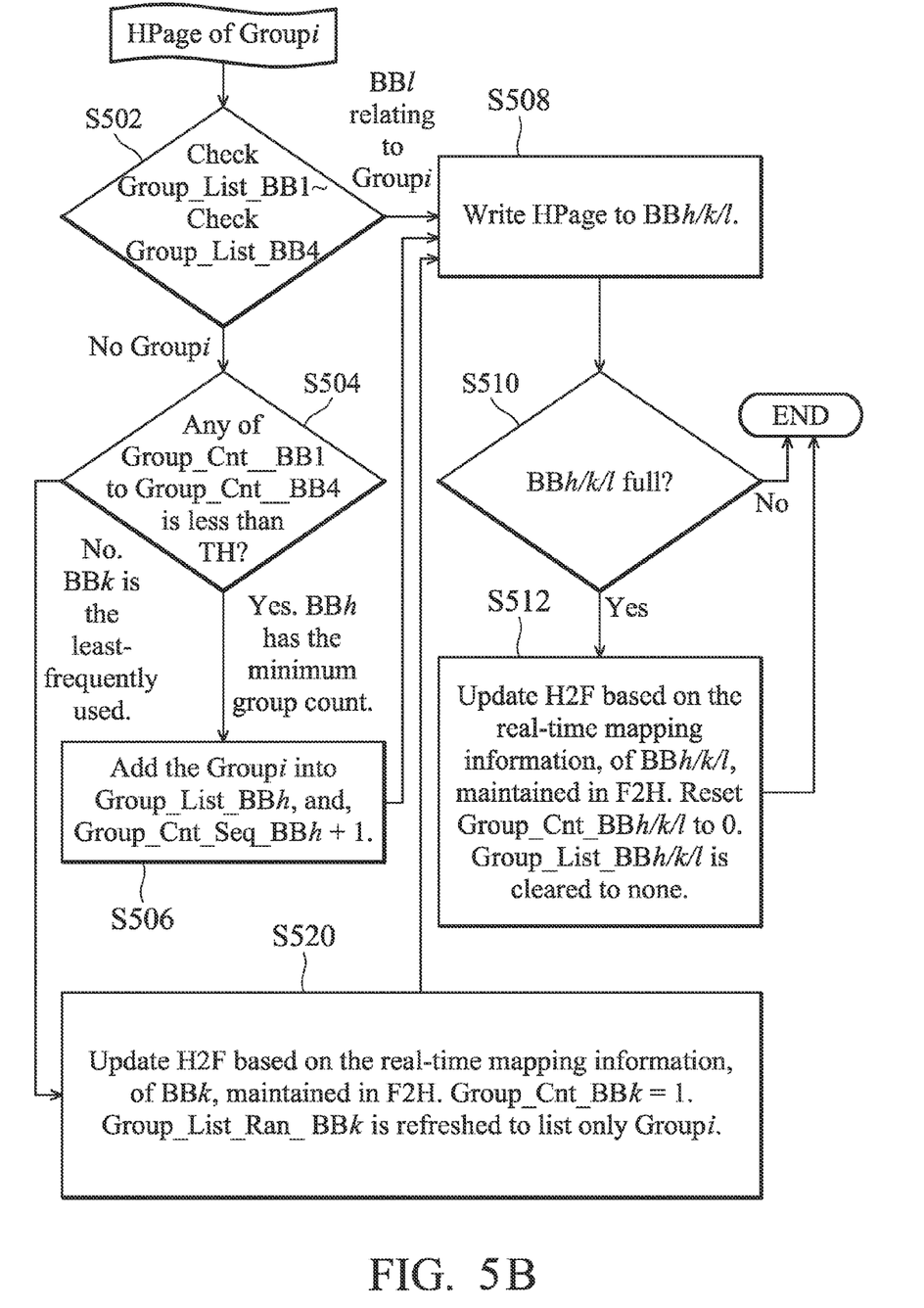

FIG. 5B shows a flowchart depicting how the logical-to-physical address mapping table H2F is updated in accordance with another exemplary embodiment of the disclosure, wherein four buffer blocks are provided as shown in FIG. 4. Comparing the steps of FIG. 5A and FIG. 5B, step S514 of FIG. 5A may be replaced by step S520 of FIG. 5B. In step S520, the logical-to-physical address mapping table H2F is updated based on the real-time mapping information about the buffer block BBk maintained in the mapping table F2H. After the mapping table H2F update, the group count Group_Cnt_BBk is refreshed to 1 and the group list Group_List_Seq_BB is refreshed to list only the group Groupi. Note that according to the exemplary embodiment of FIG. 5B, the remaining space of the buffer block BBk is still for the continued use of write-data buffering. The data density of the data blocks Data_Blks is effectively increased.

Note that in some exemplary embodiments, only one buffer block is provided to buffer write data. It is not intended to limit the number of buffer blocks.

Note that any parameter reflecting a logical address distribution of write data buffered in a buffer block and with non-updated logical-to-physical address mapping information may play the role of the aforementioned group count and/or group list. For example, when the group count is used as the parameter, the higher group count shows that the logical address distribution is more dispersed.

In some exemplary embodiments, the controller 204 may include a computing unit and a read-only memory (ROM) stored with a ROM code. The ROM code may be coded according to the disclosure to be executed by the computing unit. The disclosed table H2F update techniques, therefore, may be implemented by firmware. Further, any control method for a FLASH memory involving the disclosed table H2F update techniques is also in the scope of the disclosure.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a FLASH memory, providing storage space divided into a plurality of blocks with each block comprising a plurality of pages; and
a controller, operating the FLASH memory in accordance with commands issued from a host,
wherein:
the controller updates a logical-to-physical address mapping table between the host and the FLASH memory in accordance with a first group count of a first buffer block selected from the plurality of blocks of the FLASH memory;
the first group count reflects a first logical address distribution of write data buffered in the first buffer block and with non-updated logical-to-physical address mapping information;
the higher the first group count, the more dispersed the first logical address distribution showing distribution of logical addresses of the write data buffered in the first buffer block and with non-updated logical-to-physical address mapping information;
the controller divides each page of the logical-to-physical address mapping table into X entries for storage of physical address information of X logical addresses;
X is a number;
X logical addresses, sharing one page for recording the logical-to-physical address mapping information thereof, are classified as belonging to one group;
the controller uses $2^{nd}$ to $N_{th}$ buffer blocks selected from the plurality of blocks of the FLASH memory as well as the first buffer block to buffer write data, and N is a number;
the controller further updates the logical-to-physical address mapping table in accordance with the $2^{nd}$ to $N_{th}$ group counts of the $2^{nd}$ to $N_{th}$ buffer blocks;
the $2^{nd}$ to $N_{th}$ group counts reflect the $2^{nd}$ to $N_{th}$ logical address distributions showing distribution of logical addresses of write data buffered in the $2^{nd}$ to $N_{th}$ buffer blocks and with non-updated logical-to-physical address mapping information;
for the $2^{nd}$ to $N_{th}$ group counts a higher count value means that the logical address distribution corresponding thereto is more dispersed; and
when write data issued from the host has a logical address belonging to a group not counted in the first to $N_{th}$ group counts et and a minimum group count among the first to $N_{th}$ group counts is less than a threshold value the controller uses the buffer block having the minimum group count to buffer the write data and adds one to the minimum group count.

2. The data storage device as claimed in claim 1, wherein:
when write data issued from the host has a logical address belonging to a group already counted in the first to $N_{th}$ group counts, the controller uses the buffer block corresponding to the group to buffer the write data;

the controller updates the logical-to-physical address mapping table when any of the first to $N_{th}$ buffer blocks is full; and when write data issued from the host has a logical address belonging to a group not counted in the first to $N_{th}$ group counts yet and none of the first to $N_{th}$ group counts is less than the threshold value, the controller updates the logical-to-physical address mapping table for updating the logical-to-physical address mapping information of a least-frequently used buffer block among the first to $N_{th}$ buffer blocks, changes the least-frequently used buffer block to be a data block, and selects a substitute buffer block from the plurality of blocks of the FLASH memory to buffer the write data, and sets a group count of the substitute buffer block to be 1.

3. The data storage device as claimed in claim 1, wherein:

when write data issued from the host has a logical address belonging to a group already counted in the first to $N_{th}$ group counts, the controller selects the buffer block corresponding to the group to buffer the write data;

the controller updates the logical-to-physical address mapping table when any of the first to $N_{th}$ buffer blocks is full; and when write data issued from the host has a logical address belonging to a group not counted in the first to $N_{th}$ group counts yet and none of the first to $N_{th}$ group counts is less than the threshold value, the controller updates the logical-to-physical address mapping table for updating the logical-to-physical address mapping information of a least-frequently used buffer block among the first to $N_{th}$ buffer blocks, and uses the least-frequently used buffer block to buffer the write data, and sets a group count of the least-frequently used buffer block to 1.

4. A FLASH memory control method, comprising:

using a FLASH memory to provide storage space which is divided into a plurality of blocks, wherein each block comprises a plurality of pages;

operating the FLASH memory in accordance with commands issued from a host;

updating a logical-to-physical address mapping table between the host and the FLASH memory in accordance with a first group count of a first buffer block selected from the plurality of blocks of the FLASH memory; and dividing each page of the logical-to-physical address mapping table into X entries for storage of physical address information of X logical addresses, wherein:

the first group count reflects a first logical address distribution of write data buffered in the first buffer block and with non-updated logical-to-physical address mapping information;

the higher the first group count, the more dispersed the first logical address distribution showing distribution of logical addresses of the write data buffered in the first buffer block and with non-updated logical-to-physical address mapping information;

X is a number;

X logical addresses, sharing one page for recording the logical-to-physical address mapping information thereof, are classified as belonging to one group;

using the $2^{nd}$ to $N_{th}$ buffer blocks selected from the plurality of blocks of the FLASH memory as well as the first buffer block to buffer write data, wherein N is a number;

updating the logical-to-physical address mapping table in accordance with the $2^{nd}$ to $N_{th}$ group counts of the $2^{nd}$ to $N_{th}$ buffer blocks wherein:

the $2^{nd}$ to $N_{th}$ group counts reflect the $2^{nd}$ to $N_{th}$ logical address distributions showing distribution of logical addresses of write data buffered in the $2^{nd}$ to $N_{th}$ buffer blocks and with non-updated logical-to-physical address mapping information; and for the $2^{nd}$ to $N_{th}$ group counts a higher count value means that the logical address distribution corresponding thereto is more dispersed, and when write data issued from the host has a logical address belonging to a group not counted in the first to $N_{th}$ group counts et and a minimum group count among the first to $N_{th}$ group counts is less than a threshold value using the buffer block having the minimum group count to buffer the write data and adding one to the minimum group count.

5. The FLASH memory control method as claimed in claim 4, comprising:

when write data issued from the host has a logical address belonging to a group already counted in the first to $N_{th}$ group counts, using the buffer block corresponding to the group to buffer the write data;

updating the logical-to-physical address mapping table when any of the first to $N_{th}$ buffer blocks is full; and when write data issued from the host has a logical address belonging to a group not counted in the first to $N_{th}$ group counts yet and none of the first to $N_{th}$ group counts is less than the threshold value, updating the logical-to-physical address mapping table for updating the logical-to-physical address mapping information of a least-frequently used buffer block among the first to $N_{th}$ buffer blocks, changing the least-frequently used buffer block to be a data block, and selecting a substitute buffer block from the plurality of blocks of the FLASH memory to buffer the write data, and setting a group count of the substitute buffer block to 1.

6. The FLASH memory control method as claimed in claim 4, further comprising:

when write data issued from the host has a logical address belonging to a group already counted in the first to $N_{th}$ group counts, using the buffer block corresponding to the group to buffer the write data;

updating the logical-to-physical address mapping table when any of the first to $N_{th}$ buffer blocks is full; and when write data issued from the host has a logical address belonging to a group not counted in the first to $N_{th}$ group counts yet and none of the first to $N_{th}$ group counts is less than the threshold value, updating the logical-to-physical address mapping table for updating the logical-to-physical address mapping information of a least-frequently used buffer block among the first to $N_{th}$ buffer blocks, and using the least-frequently used buffer block to buffer the write data, and setting the group count of the least-frequently used buffer block to 1.

* * * * *